(12) United States Patent
McDonald et al.

(10) Patent No.: US 8,733,814 B1
(45) Date of Patent: May 27, 2014

(54) LATCHING CARGO STAKE

(75) Inventors: Alex McDonald, Houston, TX (US);
Lee Davis Weinstein, Arlington, MA (US); Matthew Norton, Wichita, KS (US)

(73) Assignee: Unruh Fab, Sedgwick, KS (US)

( * ) Notice: Subject to any disclaimer, the term of this patent is extended or adjusted under 35 U.S.C. 154(b) by 0 days.

(21) Appl. No.: 13/072,654

(22) Filed: Mar. 25, 2011

(51) Int. Cl.
*B61D 3/08* (2006.01)
*B62D 33/02* (2006.01)

(52) U.S. Cl.
CPC ............ *B62D 33/0207* (2013.01); *B61D 3/08* (2013.01)
USPC .............................. 296/43; 105/380; 105/390

(58) Field of Classification Search
CPC .............................. B62D 33/0207; B61D 3/08
USPC ...................................... 296/43; 105/380, 390
See application file for complete search history.

(56) References Cited

U.S. PATENT DOCUMENTS

| | | | | |
|---|---|---|---|---|
| 1,845,092 A | * | 2/1932 | Meininghaus | 296/43 |
| 5,098,147 A | * | 3/1992 | Benson et al. | 296/43 |
| 7,252,317 B2 | * | 8/2007 | Boe | 296/43 |
| 2002/0030377 A1 | * | 3/2002 | Anderson | 296/43 |
| 2010/0072780 A1 | * | 3/2010 | Barna | 296/184.1 |

* cited by examiner

*Primary Examiner* — Lori Lyjak
(74) *Attorney, Agent, or Firm* — Lee Weinstein

(57) ABSTRACT

A cargo stake is disclosed which may be secured in a stake hole without the need of inserting a pin or bolt underneath the cargo bed. In a preferred embodiment, a latching mechanism is provided internal to a cargo stake body made from box steel tubing. The latching mechanism includes a latching member which can protrude perpendicular to the axis of the cargo stake at the lower end of the cargo stake, and the latching mechanism is operable through the upper open end of the cargo stake. In a preferred embodiment the latching mechanism is spring loaded and automatically latches in place upon insertion.

7 Claims, 6 Drawing Sheets

LATCHING CARGO STAKE

FIELD OF THE INVENTION

The field of the invention relates to cargo stakes; flat-bed trucks and trailers; truck bodies and trailers intended to carry glass, glass racks, and/or cases of glass; and more specifically to flat-bed cargo carrying surfaces designed to accept cargo stakes.

BACKGROUND OF THE INVENTION

Flat glass, as used in windows and doors (as distinct from curved glass used in automobiles and the like) is typically transported on angled racks or in cases on a flat surfaced truck body or trailer bed. Many angled racks are permanently attached to or are part of the truck body or trailer. Others are removable racks to be left at a job site; leaving a full rack at a job site makes delivery quicker and allows for a place for the customer to hold the glass until it is installed. Similarly, glass may be shipped in cases which can be carried on the angled racks or on flatbeds. Glass cases vary in size and need to be carried vertically and anchored to the transporting cargo bed in such a way as to not break the glass, either while anchoring it, or subsequently in transit. Glass cases are typically anchored to a truck flat bed by attaching such cases to large vertical stakes which are affixed in vertical stake holes in the (truck or trailer) bed. Many stake holes are typically provided on such flat beds and stakes are positioned on the bed depending on the load and therefore are removable.

Stakes are typically fastened to the cargo bed (by hardware such as bolts or pins) after being positioned appropriately for the cargo to be carried. Stakes are typically attached by sliding the lower end of the stake into a stake hole in the cargo bed and fastening in place with a pin, such as a lynch pin or bent arm pin, below the cargo bed, preventing the stake from bouncing or vibrating out in transit. This works well for most trucking applications because most cargo transported on flat-beds is strapped down on the sides of the trailer or body where it is easy to stand on the side of the trailer or body and attach the stake-affixing hardware). However, in flat-bed trailers used to transport glass, because of the sizes of glass cases and the fact that they are fragile and need to be kept vertical, there need to be stake positions not only on the edge of the bed but also throughout the middle part of the bed. Affixing stakes in the middle of the bed is inconvenient because one has to crawl under the truck or trailer to pin or bolt the stakes in place. There is a need for innovative cargo stakes which can be affixed to a cargo bed without having to get under the truck or trailer.

Stake holes are typically fashioned by welding a section of box steel tubing just below a matching hole in the cargo deck. Typical cargo stakes used in flat-bed stake holes are fashioned of 3" outside diameter (O.D.) box steel tubing, and typical stake holes are fashioned by welding a cut section of box steel tubing (which is open at both ends) with an inside diameter (I.D.) slightly larger than the stake O.D. Stakes are typically fashioned such that in the installed position, the lower end of the stake extends below the lower end of the stake hole box steel tubing section, and stakes are typically secured in place by placing a pin or bolt through the stake below the lower end of the stake hole box steel tubing.

In the process of removing, storing, transporting, and reconfiguring cargo stakes, attachment hardware such as removable pins are often lost. There is a need for a innovative methods of affixing cargo stakes that diminishes or eliminates the chance of stake-affixing hardware being lost. Additionally, it is desirable for any such innovative new cargo stake to be compatible with (and easily affixed within) existing stake holes.

Trucking equipment is often treated roughly, so cargo stakes need to be designed in such a way that they can be thrown on the ground from a truck body or trailer, without sustaining functional damage (for instance damage to any attachment features).

Cargo systems are typically configured by large men with big hands, and often men wear work gloves to protect their hands, so there is a need for innovative stake attachment methods that work well with big hands that may be wearing work gloves.

SUMMARY OF THE INVENTION

It is an object of the present invention to provide cargo stakes suitable for repeated rapid installation in and removal from stake holes in a truck body or trailer bed. It is a further object of the present invention to provide cargo stakes that may be fastened in place in existing cargo stake holes without necessitating personnel going below the cargo bed surface during the fastening process. It is a further object of the present invention to provide cargo stakes which may be fastened in and removed from stake holes without the need of installing or removing separate hardware such as bolts or pins. It is a further object of the present invention to provide cargo stakes (with integral fastening hardware) which are durable and will remain undamaged when tossed about as may typically happen on steel or concrete surfaces.

In a preferred embodiment, the main structural portion of a cargo stake according to the present invention is formed of steel box tubing. The stake incorporates a latching mechanism which is mostly internal, with a latch member which protrudes and engages a feature in the stake hole in which the stake is to be fastened, fastening the stake in the stake hole. In a preferred embodiment, the latching member may be disengaged by actuating a lever (internal to the stake), which may be accessed through the upper open end of the stake during the installation and removal process. In one preferred embodiment, the stake fastens itself in place when inserted into the stake hole, without need of manual actuation of the internal mechanism, and the latching mechanism is manually disengaged by accessing a lever mechanism through the top of the stake at the time of removal. In an alternate embodiment, both the fastening and removal operations involve accessing engagement and disengagement mechanisms (internal to the stake) through the top of the stake during stake installation and removal.

In an alternate preferred embodiment not requiring any specific feature in the stake hole to align with a latching mechanism, the stake is fastened in place by actuating an internal lever mechanism which effectively increases the circumference of the lower end of the stake such that it interferes with the inner surface of the stake hole, and the stake is thus clamped in place by friction force between two of its lower outer opposing faces, and two inner opposing faces of the stake hole within which the stake is mounted.

In a preferred embodiment, a release handle that is recessed within the protection of the upper end of the stake body is positioned such that fingers of a large hand wearing a work glove fit in place to actuate the release handle.

DETAILED DESCRIPTIONS OF SOME PREFERRED EMBODIMENTS

Figure 6:
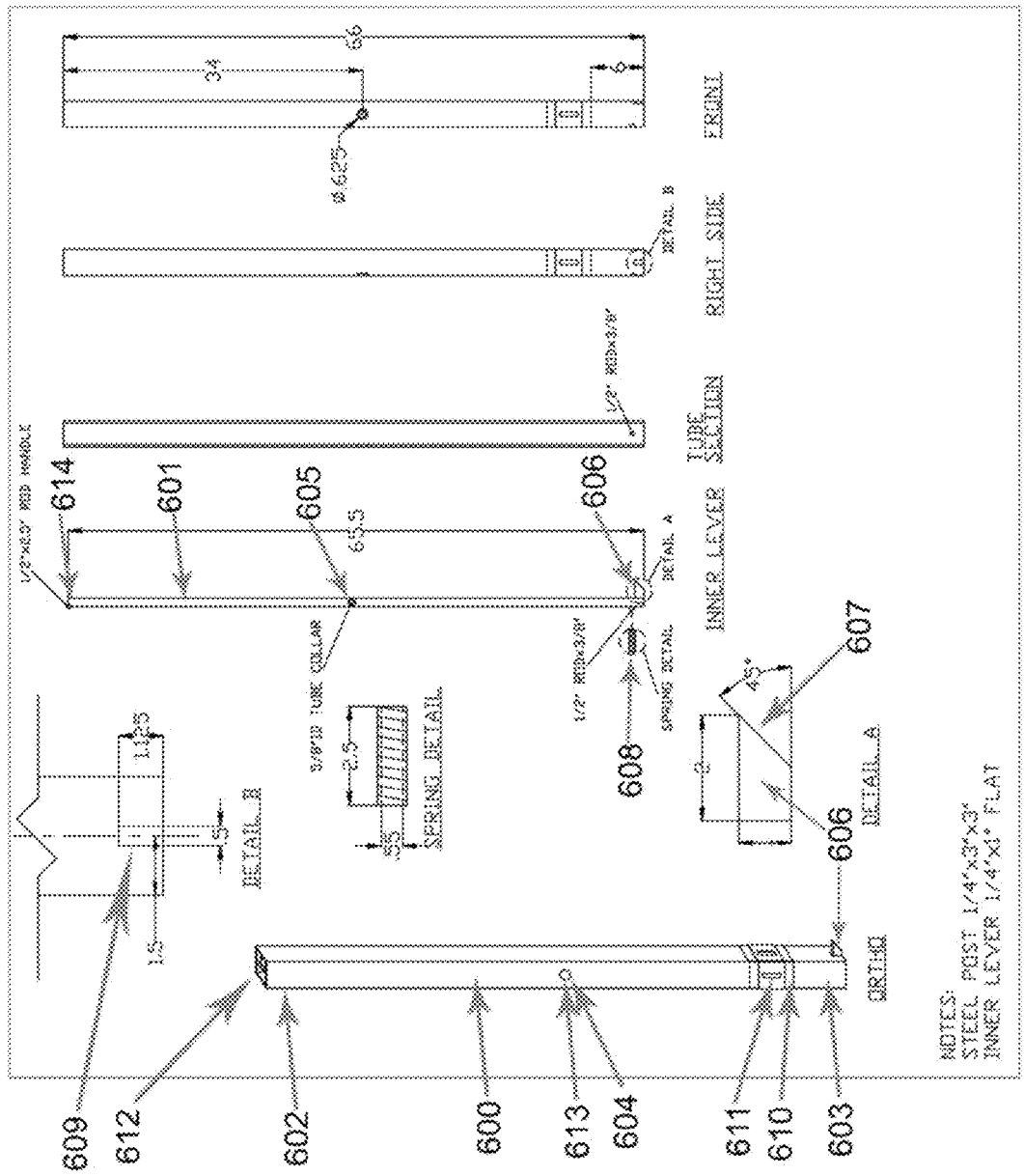
FIG. 6 is a mechanical drawing of a preferred embodiment of the present invention.

FIG. 6 is a mechanical drawing of a preferred embodiment of the present invention, where an integral latching mechanism is used to affix the cargo stake in an existing standard stake hole. Assembled cargo stake 600 contains latch lever 601 which runs internally from stake top 602 to stake bottom 603, pivoting at pivot point 613 comprising pivot hole 604 and ⅝" ID tube collar 605. Latching member 606 is mounted at the bottom end of lever 601 and protrudes from stake 600 in the installed state, engaging (for instance) the bottom edge of the box steel tubing portion of a typical stake hole, or engaging a pin or bolt hole that might exist within an existing stake hole. Beveled surface 607 on latching member 606 contacts the edge of any standard 3" stake hole into which stake 600 is inserted, and insertion force acts to compress spring 608 during installation, allowing latching member 606 to momentarily retract into slot 609.

Figure 3:
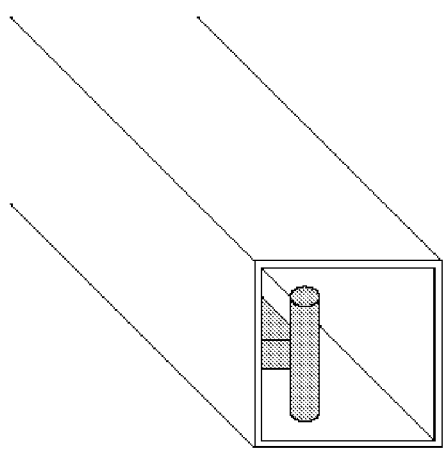
FIG. 3 is a photograph of the latch-releasing mechanism of a preferred embodiment of the present invention.

Once stake 600 is inserted all the way into a stake hole, latch member 606 protrudes below the collar of the stake hole or into a mating pin hole or the like, formed in the 3" stake hole in which stake 600 is installed. Insertion stop 610 acts to limit the depth (into the stake hole) to which stake 600 is inserted, and also includes slots 611, which facilitate fastening cargo. To unfasten and release stake 600 from a stake hole, one manually reaches through top opening 612 and moves the upper end of lever 601 (a photo of which is shown in FIG. 3) so as to retract latching member 606, before removing stake 600 from the stake hole in which it is installed.

In a preferred embodiment, the body of stake 600 is formed of box steel tubing with a 3" O.D. In a preferred embodiment, an additional internal lever latching mechanism may be provided inside stake 100 to latch lever 601 in position such that latching member 606 remains retracted when stake 600 is not installed in a stake hole. This prevents possible damage to latching member 606 when stake 600 may be tossed about on concrete or steel surfaces during routine handling. In such a preferred embodiment, a manual release would be provided for such lever latching mechanism, accessible through open end 612 or some functionally equivalent access hole.

In an alternate embodiment of the present invention, the stake is designed to be affixed in a stake hole whose inner walls are of unknown depth and without a known pin hole. In such an embodiment, latching member 606 may be designed to press against the inner wall of the stake hole in the installed state, and may be spring loaded to stay just barely recessed in slot 609 in the uninstalled state. In such a preferred embodiment, pivot point 613 may be closer to lower stake end 603 than to upper stake end 602, such that lever 601 can be used to provide leverage and amplify force manually applied at lever upper end 614. In such an embodiment, a releasable one-way sliding mechanism (such as is typically found on an adjustable pipe clamp) is provided linking upper lever end 614 to upper stake housing 602, such that when lever upper end 614 is squeezed to protrude latching member 606 slightly under leverage to clamp stake 600 in the installed position, the sliding mechanism holds this clamped state until the sliding mechanism is released manually (for instance through upper opening 612).

Figure 1:
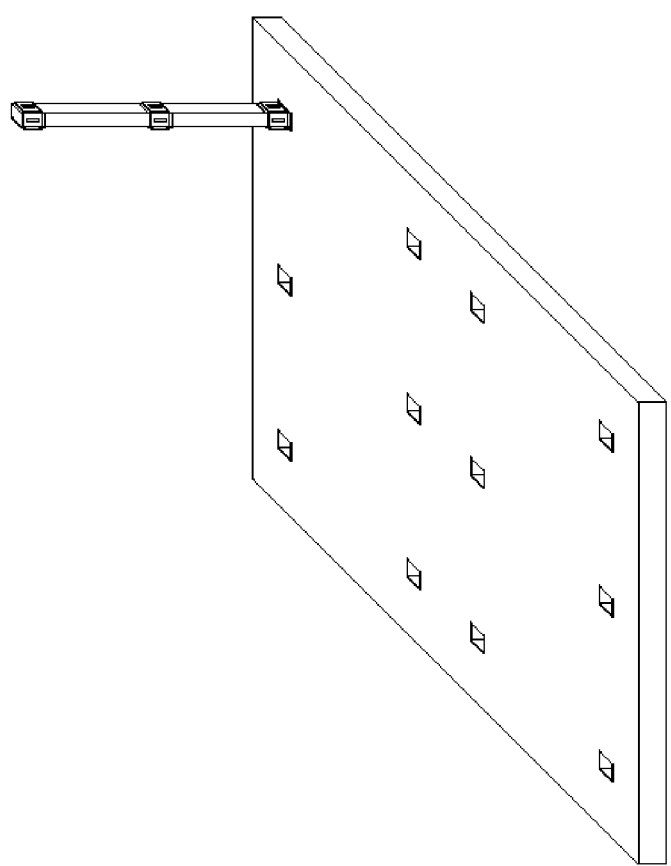
FIG. 1 is a photograph of a latching stake according to the present invention installed in a cargo bed.
Figure 2:
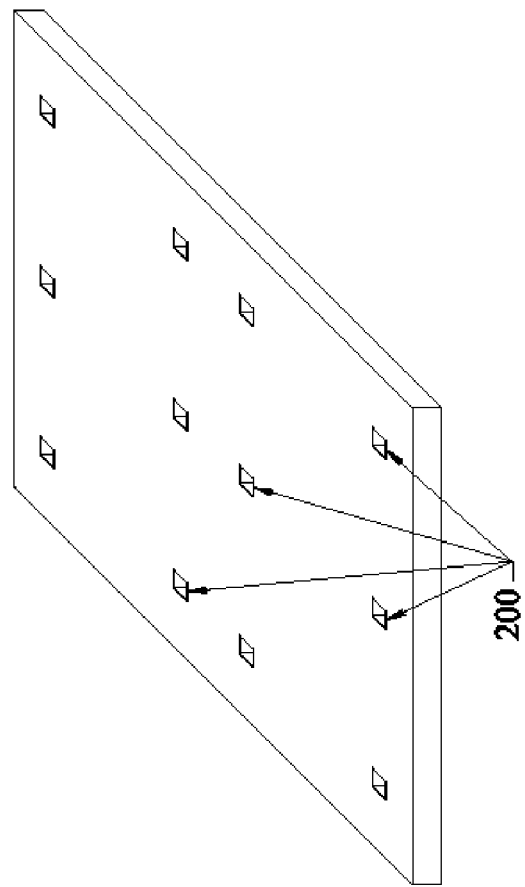
FIG. 2 is a photograph of a truck body bed equipped with stake holes suitable for the installation of the cargo stakes of the present invention.
Figure 4:
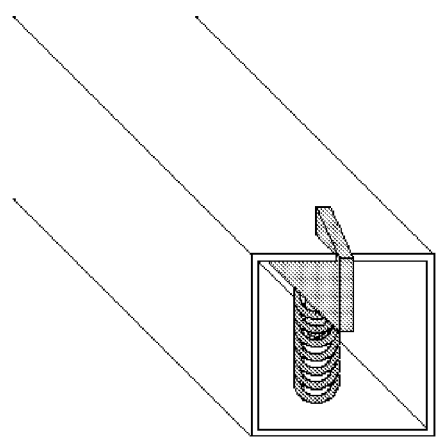
FIG. 4 is a photograph of the bottom portion of a latching cargo stake according to a preferred embodiment of the present invention.
Figure 5:
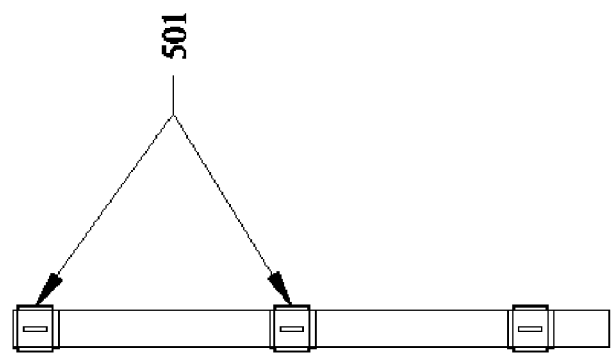
FIG. 5 is a photograph of latching cargo stakes according to a preferred embodiment of the present invention.

A photo of a preferred embodiment of cargo stakes according to the present invention is shown in FIG. 5. These stakes include additional cargo attachment hardware 501. A cargo bed with stake holes 200 (in which the cargo stakes of the present invention can be installed) is shown in FIG. 2. A cargo stake according to the present invention is shown mounted in a stake hole in FIG. 1. A photo of the bottom end of a preferred embodiment of a cargo stake according to the present invention is shown in FIG. 4.

The foregoing discussion should be understood as illustrative and should not be considered to be limiting in any sense. While this invention has been particularly shown and described with references to preferred embodiments thereof, it will be understood by those skilled in the art that various changes in form and details may be made therein without departing from the spirit and scope of the invention as defined by the claims.

What is claimed is:

1. A latching cargo stake capable of being in a latched state or a release state, comprising:
   a hollow stake body;
   manually operable latch-releasing means;
   a latching member which protrudes through an opening in said body enough to interfere with the inner surface of a stake hole in which said stake is installed when said stake is in said latched state, and which does not protrude from said body enough to interfere with the inner surface of a stake hole in which said stake is being inserted when said stake is in said released state.

2. The latching cargo stake of claim 1, wherein said stake body is sized to fit standard stake holes, and said latching member is positioned to engage where standard pins or bolts would engage.

3. The latching cargo stake of claim 1, wherein said latching member is spring-loaded and beveled, such that when said latching member is protruding from said body, said stake can be manually inserted into a stake hole, and during said insertion process, insertion force will sequentially act to at least partly retract said latching member within said body, allowing said latching member to protrude again at the end of the insertion process, and engage a latching feature in said stake hole.

4. The latching cargo stake of claim 1, wherein said latching means is housed within said stake body and hand-actuatable through an access hole in said body.

5. The latching cargo stake of claim 4, wherein said access hole is located above said cargo deck when said cargo stake is installed in such stake hole.

6. The latching cargo stake of claim 5, wherein such latch-releasing means is positioned so as to be operable by a hand well fitted with an extra-large work glove.

7. The latching cargo stake of claim 4, wherein said latching stake is sized to engage standard cargo stake holes as may be found on flat-bed trucks and trailers.

* * * * *